US009221693B2

(12) United States Patent
Kawahashi et al.

(10) Patent No.: US 9,221,693 B2
(45) Date of Patent: Dec. 29, 2015

(54) METHOD FOR PRODUCING POSITIVE ELECTRODE ACTIVE MATERIAL FOR LITHIUM ION BATTERIES AND POSITIVE ELECTRODE ACTIVE MATERIAL FOR LITHIUM ION BATTERIES

(75) Inventors: Yasuhiro Kawahashi, Kitaibaraki (JP); Yoshio Kajiya, Kitaibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 217 days.

(21) Appl. No.: 13/695,663

(22) PCT Filed: Oct. 4, 2011

(86) PCT No.: PCT/JP2011/072860
§ 371 (c)(1),
(2), (4) Date: Nov. 1, 2012

(87) PCT Pub. No.: WO2012/132071
PCT Pub. Date: Oct. 4, 2012

(65) Prior Publication Data
US 2013/0043428 A1 Feb. 21, 2013

(30) Foreign Application Priority Data

Mar. 29, 2011 (JP) ................................. 2011-073298

(51) Int. Cl.
*C01G 53/00* (2006.01)
*H01M 4/131* (2010.01)
(Continued)

(52) U.S. Cl.
CPC ............... *C01G 53/50* (2013.01); *H01M 4/131* (2013.01); *H01M 4/1391* (2013.01);
(Continued)

(58) Field of Classification Search
CPC ......... C01G 53/00; C01D 15/00; H01M 4/58; H01M 4/04; H01M 4/131; H01M 4/36
USPC .................. 252/182.1; 432/241; 241/181, 183
See application file for complete search history.

(56) References Cited

U.S. PATENT DOCUMENTS 2,165,128 A * 7/1939 Cheesman ...................... 432/48
4,443,186 A * 4/1984 Shell .............................. 432/103
(Continued)

FOREIGN PATENT DOCUMENTS

CN      1520621 A    8/2004
CN      1701451 A    11/2005
(Continued)

OTHER PUBLICATIONS

English Machine Translation of JP 2007-257890 (2006).*
(Continued)

*Primary Examiner* — Peter F Godenschwager
*Assistant Examiner* — Andrew J Oyer
(74) *Attorney, Agent, or Firm* — Nields, Lemack & Frame, LLC

(57) ABSTRACT

The present invention provides a method for producing a high quality positive electrode active material for lithium ion batteries at low cost and at excellent production efficiency. The method for producing a positive electrode active material for lithium ion batteries includes a step of firing a powder of lithium-containing carbonate that is a precursor for positive electrode active material for lithium ion batteries in a rotary kiln. In the step, a temperature at a powder feed part inside of the rotary kiln is kept at 500° C. or more.

6 Claims, 2 Drawing Sheets

(51) Int. Cl.
*H01M 4/1391* (2010.01)
*H01M 4/485* (2010.01)
*H01M 4/505* (2010.01)
*H01M 4/525* (2010.01)

(52) U.S. Cl.
CPC ............. *H01M 4/485* (2013.01); *H01M 4/505* (2013.01); *H01M 4/525* (2013.01); *C01P 2006/40* (2013.01); *Y02E 60/122* (2013.01); *Y02P 70/54* (2015.11)

(56) References Cited

U.S. PATENT DOCUMENTS

| | | | |
|---|---|---|---|
| 4,462,793 A * | 7/1984 | Maeda et al. | .................... 432/14 |
| 4,469,654 A | 9/1984 | Haskett et al. | |
| 5,393,622 A | 2/1995 | Nitta et al. | |
| 5,478,674 A | 12/1995 | Miyasaka | |
| 5,759,714 A | 6/1998 | Matsufuji et al. | |
| 6,037,095 A | 3/2000 | Miyasaka | |
| 6,123,911 A | 9/2000 | Yamaguchi et al. | |
| 6,423,447 B1 | 7/2002 | Ohsaki et al. | |
| 6,582,854 B1 | 6/2003 | Qi et al. | |
| 6,984,469 B2 | 1/2006 | Kweon et al. | |
| 7,332,248 B2 | 2/2008 | Kase et al. | |
| 7,410,728 B1 | 8/2008 | Fujimoto et al. | |
| 7,645,542 B2 | 1/2010 | Kase et al. | |
| 8,354,191 B2 | 1/2013 | Shizuka et al. | |
| 8,623,551 B2 | 1/2014 | Kawahashi et al. | |
| 8,748,041 B2 | 6/2014 | Satoh et al. | |
| 8,993,160 B2 | 3/2015 | Nagase | |
| 9,090,481 B2 | 7/2015 | Satoh | |
| 2002/0106561 A1 | 8/2002 | Lee et al. | |
| 2003/0082448 A1 | 5/2003 | Cho et al. | |
| 2003/0104279 A1 | 6/2003 | Miyazaki et al. | |
| 2003/0126803 A1 * | 7/2003 | Rosenflanz | .................... 51/307 |
| 2003/0211391 A1 | 11/2003 | Cho et al. | |
| 2004/0053134 A1 | 3/2004 | Ozaki et al. | |
| 2004/0110063 A1 | 6/2004 | Uchitomi et al. | |
| 2004/0197658 A1 | 10/2004 | Kase et al. | |
| 2005/0079416 A1 | 4/2005 | Ohzuku et al. | |
| 2005/0142442 A1 | 6/2005 | Yuasa et al. | |
| 2005/0158546 A1 | 7/2005 | Shizuka | |
| 2006/0083989 A1 | 4/2006 | Suhara et al. | |
| 2006/0121350 A1 | 6/2006 | Kajiya et al. | |
| 2006/0127765 A1 | 6/2006 | Machida et al. | |
| 2006/0204849 A1 | 9/2006 | Saito et al. | |
| 2006/0233696 A1 | 10/2006 | Paulsen et al. | |
| 2006/0281005 A1 | 12/2006 | Cho et al. | |
| 2007/0015058 A1 | 1/2007 | Takezawa et al. | |
| 2007/0141469 A1 | 6/2007 | Tokunaga et al. | |
| 2007/0202405 A1 | 8/2007 | Shizuka et al. | |
| 2007/0248883 A1 | 10/2007 | Oda et al. | |
| 2007/0298512 A1 | 12/2007 | Park et al. | |
| 2008/0044736 A1 | 2/2008 | Nakura | |
| 2008/0081258 A1 | 4/2008 | Kim et al. | |
| 2009/0117464 A1 | 5/2009 | Cho et al. | |
| 2009/0117469 A1 | 5/2009 | Hiratsuka et al. | |
| 2009/0148772 A1 | 6/2009 | Kawasato et al. | |
| 2009/0233176 A1 | 9/2009 | Kita et al. | |
| 2009/0286164 A1 | 11/2009 | Wada et al. | |
| 2009/0289218 A1 | 11/2009 | Kajiya et al. | |
| 2009/0299922 A1 | 12/2009 | Malcus et al. | |
| 2009/0305136 A1 | 12/2009 | Yada et al. | |
| 2010/0015514 A1 | 1/2010 | Miyagi et al. | |
| 2010/0019194 A1 | 1/2010 | Fujiwara et al. | |
| 2010/0112447 A1 | 5/2010 | Yamamoto et al. | |
| 2010/0136412 A1 | 6/2010 | Watanabe | |
| 2010/0143583 A1 | 6/2010 | Honda et al. | |
| 2010/0183922 A1 | 7/2010 | Cho et al. | |
| 2010/0209757 A1 | 8/2010 | Ooyama et al. | |
| 2010/0209771 A1 | 8/2010 | Shizuka et al. | |
| 2010/0227222 A1 | 9/2010 | Chang et al. | |
| 2011/0031437 A1 | 2/2011 | Nagase et al. | |
| 2011/0033749 A1 | 2/2011 | Uchida et al. | |
| 2011/0076558 A1 | 3/2011 | Miyazaki et al. | |
| 2011/0250499 A1 | 10/2011 | Hiratsuka | |
| 2012/0034525 A1 | 2/2012 | Satoh et al. | |
| 2012/0231342 A1 | 9/2012 | Satoh et al. | |
| 2012/0231343 A1 | 9/2012 | Nagase et al. | |
| 2012/0244434 A1 | 9/2012 | Nagase | |
| 2012/0292562 A1 | 11/2012 | Kajiya et al. | |
| 2012/0319036 A1 | 12/2012 | Kajiya et al. | |
| 2012/0319037 A1 | 12/2012 | Kawahashi et al. | |
| 2012/0319039 A1 | 12/2012 | Satoh et al. | |
| 2012/0319040 A1 | 12/2012 | Okamoto et al. | |
| 2012/0321956 A1 | 12/2012 | Kawahashi et al. | |
| 2012/0326080 A1 | 12/2012 | Okamoto et al. | |
| 2012/0326098 A1 | 12/2012 | Satoh | |
| 2012/0326099 A1 | 12/2012 | Satoh | |
| 2012/0326101 A1 | 12/2012 | Satoh | |
| 2012/0326102 A1 | 12/2012 | Satoh | |
| 2013/0001463 A1 | 1/2013 | Okamoto et al. | |
| 2013/0004849 A1 | 1/2013 | Satoh | |
| 2013/0108921 A1 | 5/2013 | Kase et al. | |
| 2013/0143121 A1 | 6/2013 | Kobayashi et al. | |
| 2013/0175470 A1 | 7/2013 | Kajiya et al. | |
| 2013/0221271 A1 | 8/2013 | Nagase et al. | |
| 2013/0316239 A1 | 11/2013 | Okamoto | |
| 2014/0306152 A1 | 10/2014 | Okamoto | |
| 2014/0339465 A1 | 11/2014 | Okamoto | |
| 2014/0339466 A1 | 11/2014 | Okamoto | |
| 2015/0123029 A1 | 5/2015 | Nagase et al. | |
| 2015/0188134 A1 | 7/2015 | Kameyama et al. | |

FOREIGN PATENT DOCUMENTS

| | | | |
|---|---|---|---|
| CN | 1710735 A * | 12/2005 | .............. H01M 4/58 |
| CN | 101478044 A | 7/2009 | |
| EP | 0794155 A1 | 9/1997 | |
| EP | 0903796 A1 | 3/1999 | |
| EP | 1244164 A1 | 9/2002 | |
| EP | 1317008 A2 | 6/2003 | |
| EP | 1391950 A1 | 2/2004 | |
| EP | 1450423 A1 | 8/2004 | |
| EP | 1742281 A1 | 1/2007 | |
| EP | 2023426 A1 | 2/2009 | |
| EP | 2207226 A1 | 7/2010 | |
| EP | 2207227 A1 | 7/2010 | |
| EP | 2219251 A1 | 8/2010 | |
| EP | 2533333 A1 | 12/2012 | |
| JP | 4-328277 | 11/1992 | |
| JP | 6-275274 A | 9/1994 | |
| JP | 7-29603 A | 1/1995 | |
| JP | 7-211311 A | 8/1995 | |
| JP | 8-138669 A | 5/1996 | |
| JP | 8-213015 A | 8/1996 | |
| JP | 09-82325 A | 3/1997 | |
| JP | 9-120813 A | 5/1997 | |
| JP | 9-270257 A | 10/1997 | |
| JP | 10-83815 A | 3/1998 | |
| JP | 10-116618 A | 5/1998 | |
| JP | 10-188986 A | 7/1998 | |
| JP | 10-206322 A | 8/1998 | |
| JP | 10-208744 A | 8/1998 | |
| JP | 10-302779 A | 11/1998 | |
| JP | 10-321224 A | 12/1998 | |
| JP | 11-16573 A | 1/1999 | |
| JP | 11-67205 A | 3/1999 | |
| JP | 11-273676 A | 10/1999 | |
| JP | 11-292542 A | 10/1999 | |
| JP | 11-307094 A | 11/1999 | |
| JP | 11-345615 A | 12/1999 | |
| JP | 2000-30693 A | 1/2000 | |
| JP | 2000-72445 A | 3/2000 | |
| JP | 2000-149945 A | 5/2000 | |
| JP | 2000-215884 A | 8/2000 | |
| JP | 2000-348721 A | 12/2000 | |
| JP | 2001-110420 A | 4/2001 | |
| JP | 2001-148249 A | 5/2001 | |
| JP | 2001-223008 A | 8/2001 | |
| JP | 2001-266851 A | 9/2001 | |
| JP | 2002-63901 A | 2/2002 | |
| JP | 2002-124261 A | 4/2002 | |
| JP | 3276183 B2 | 4/2002 | |

(56) References Cited

FOREIGN PATENT DOCUMENTS

| | | |
|---|---|---|
| JP | 2002-164053 A | 6/2002 |
| JP | 2002-203552 A | 7/2002 |
| JP | 2002-216745 A | 8/2002 |
| JP | 2002-260655 A | 9/2002 |
| JP | 2002-289261 A | 10/2002 |
| JP | 2002-298914 A | 10/2002 |
| JP | 3334179 B2 | 10/2002 |
| JP | 2003-7299 A | 1/2003 |
| JP | 2003-17052 A | 1/2003 |
| JP | 2003-81637 A | 3/2003 |
| JP | 2003-151546 A | 5/2003 |
| JP | 2003-229129 A | 8/2003 |
| JP | 2004-6264 A | 1/2004 |
| JP | 2004-146374 A | 5/2004 |
| JP | 2004-172109 A | 6/2004 |
| JP | 2004-193115 A | 7/2004 |
| JP | 2004-214187 A | 7/2004 |
| JP | 2004-227790 A | 8/2004 |
| JP | 2004-253169 A | 9/2004 |
| JP | 2004-273451 A | 9/2004 |
| JP | 2004-355824 A | 12/2004 |
| JP | 2004-356094 A | 12/2004 |
| JP | 2005-11713 A | 1/2005 |
| JP | 2005-44743 A | 2/2005 |
| JP | 2005-53764 A | 3/2005 |
| JP | 2005-56602 A | 3/2005 |
| JP | 2005-60162 A | 3/2005 |
| JP | 2005-75691 A | 3/2005 |
| JP | 2005-183366 A | 7/2005 |
| JP | 2005-225734 A | 8/2005 |
| JP | 2005-235624 A | 9/2005 |
| JP | 2005-243636 A | 9/2005 |
| JP | 2005-251700 A | 9/2005 |
| JP | 2005-285572 A | 10/2005 |
| JP | 2005-289700 A | 10/2005 |
| JP | 2005-302507 A | 10/2005 |
| JP | 2005-302628 A | 10/2005 |
| JP | 2005-324973 A | 11/2005 |
| JP | 2005-327644 A | 11/2005 |
| JP | 2005-332707 A | 12/2005 |
| JP | 2005-347134 A | 12/2005 |
| JP | 2006-4724 A | 1/2006 |
| JP | 2006-19229 A | 1/2006 |
| JP | 2006-19310 A | 1/2006 |
| JP | 2006-54159 A | 2/2006 |
| JP | 2006-107818 A | 4/2006 |
| JP | 2006-107845 A | 4/2006 |
| JP | 2007-257890 A * | 4/2006 .............. H01M 4/58 |
| JP | 2006-127923 A | 5/2006 |
| JP | 2006-127955 A | 5/2006 |
| JP | 2006-134816 A | 5/2006 |
| JP | 2006-134852 A | 5/2006 |
| JP | 2006-156126 A | 6/2006 |
| JP | 2006-156235 A | 6/2006 |
| JP | 2006-164758 A | 6/2006 |
| JP | 2006-286614 A | 10/2006 |
| JP | 3835266 B2 | 10/2006 |
| JP | 2006-302542 A | 11/2006 |
| JP | 2006-351379 A | 12/2006 |
| JP | 2007-48744 A | 2/2007 |
| JP | 2007-95443 A | 4/2007 |
| JP | 2007-194202 A | 8/2007 |
| JP | 2007-214138 A | 8/2007 |
| JP | 2007-226969 A | 9/2007 |
| JP | 2007-227368 A | 9/2007 |
| JP | 2007-257890 A | 10/2007 |
| JP | 2007-280723 A | 10/2007 |
| JP | 2008-13405 A | 1/2008 |
| JP | 4070585 B2 | 4/2008 |
| JP | 2008-103132 A | 5/2008 |
| JP | 2008-181708 A | 8/2008 |
| JP | 2008-192547 A | 8/2008 |
| JP | 2008-266136 A | 11/2008 |
| JP | 2008-277106 A | 11/2008 |
| JP | 4175026 B2 | 11/2008 |
| JP | 2008-544468 A | 12/2008 |
| JP | 2009-117365 A | 5/2009 |
| JP | 2009-135070 A | 6/2009 |
| JP | 2009-151959 A | 7/2009 |
| JP | 4287901 B2 | 7/2009 |
| JP | 2009-289726 A | 12/2009 |
| JP | 2010-15959 A | 1/2010 |
| JP | 2010-47466 A | 3/2010 |
| JP | 2010-192200 A | 9/2010 |
| JP | 2011-44364 A | 3/2011 |
| JP | 2012-169224 A | 9/2012 |
| JP | 2012-243572 A | 12/2012 |
| JP | 2013-152911 A | 8/2013 |
| KR | 10-2010-0060362 A | 6/2010 |
| TW | 363940 | 7/1999 |
| WO | 02/086993 A1 | 10/2002 |
| WO | 03/003489 A1 | 1/2003 |
| WO | 2004/064180 A1 | 7/2004 |
| WO | 2007/072759 A1 | 6/2007 |
| WO | 2008/084679 A1 | 7/2008 |
| WO | 2009/011157 A1 | 1/2009 |
| WO | 2009/060603 A1 | 5/2009 |
| WO | 2009/063838 A1 | 5/2009 |
| WO | 2009/128289 A1 | 10/2009 |
| WO | 2010/049977 A1 | 5/2010 |
| WO | 2010/113512 A1 | 10/2010 |
| WO | 2010/113583 A1 | 10/2010 |
| WO | 2011/007751 A1 | 1/2011 |
| WO | 2011/065391 A1 | 6/2011 |
| WO | 2011/108720 A1 | 9/2011 |
| WO | 2011/122448 A1 | 10/2011 |
| WO | 2012/098724 A1 | 7/2012 |
| WO | 2012/132072 A1 | 10/2012 |
| WO | 2012/157143 A1 | 11/2012 |

OTHER PUBLICATIONS

English Machine Translation of CN1710735 (2005).*
International Preliminary Report on Patentability mailed Nov. 22, 2012 in co-pending PCT application No. PCT/JP2011/054938.
International Preliminary Report on Patentability mailed Nov. 22, 2012 in co-pending PCT application No. PCT/JP2011/055111.
International Search Report mailed Nov. 1, 2011 in co-pending PCT application No. PCT/JP2011/066722.
International Search Report mailed Apr. 10, 2012 in co-pending PCT application No. PCT/JP2011/079535.
Office Action-Restriction-mailed Mar. 12, 2013 in co-pending U.S. Appl. No. 13/508,887.
Office Action mailed Mar. 13, 2013 in co-pending U.S. Appl. No. 13/582,091.
European communication issued May 9, 2014 in co-pending European patent application No. EP 11739870.1.
Chinese communication dated May 12, 2014 in co-pending Chinese patent application No. CN 201180008573.3.
European communication issued May 9, 2014 in co-pending European patent application No. EP 11750704.6.
European communication issued May 22, 2014 in co-pending European patent application No. EP 11750705.3.
European communication issued May 6, 2014 in co-pending European patent application No. EP 11845955.1.
International Search Report mailed Dec. 25, 2012 in co-pending PCT application No. PCT/JP2012/074263.
International Search Report mailed Dec. 25, 2012 in co-pending PCT application No. PCT/JP2012/074266.
International Search Report mailed Dec. 25, 2012 in co-pending PCT application No. PCT/JP2013/064941.
Final Rejection mailed Jun. 18, 2014 in co-pending U.S. Appl. No. 13/508,880.
Final Rejection mailed Jun. 3, 2014 in co-pending U.S. Appl. No. 13/514,080.
Office Action mailed Jul. 1, 2014 in co-pending U.S. Appl. No. 13/576,548.
Office Action mailed Jul. 8, 2014 in co-pending U.S. Appl. No. 13/576,753.
International Search Report mailed Jun. 8, 2010 in co-pending PCT application No. PCT/JP2010/053443.

(56) References Cited

OTHER PUBLICATIONS

International Preliminary Report on Patentability mailed Nov. 17, 2011 in co-pending PCT application No. PCT/JP2010/053443.
International Search Report mailed May 24, 2011 in co-pending PCT application No. PCT/JP2011/053271.
International Search Report/Written Opinion mailed Mar. 8, 2011 in co-pending PCT application No. PCT/JP2010/071723.
International Preliminary Report on Patentability mailed Jul. 12, 2012 in co-pending PCT application No. PCT/JP2010/071723.
International Search Report mailed Jan. 24, 2012 in corresponding PCT application No. PCT/JP2011/072860.
International Search Report/Written Opinion mailed Jan. 25, 2011 in co-pending PCT application No. PCT/JP2010/071724.
International Preliminary Report on Patentability issued Jul. 10, 2012 in co-pending PCT application No. PCT/JP2010/071724.
International Search Report mailed Apr. 26, 2011 in co-pending PCT application No. PCT/JP2011/052394.
International Preliminary Report on Patentability mailed Oct. 11, 2012 in co-pending PCT application No. PCT/JP2011/052394.
International Search Report mailed May 10, 2011 in co-pending PCT application No. PCT/JP2011/052399.
International Preliminary Report on Patentability mailed Oct. 11, 2012 in co-pending PCT application No. PCT/JP2011/052399.
International Search Report mailed Nov. 15, 2011 in co-pending PCT application No. PCT/JP2011/069042.
International Search Report/Written Opinion mailed Jun. 7, 2011 in co-pending PCT application No. PCT/JP2011/054935.
International Preliminary Report on Patentability mailed Oct. 11, 2012 in co-pending PCT application No. PCT/JP2011/054935.
International Search Report mailed Jun. 7, 2011 in co-pending PCT application No. PCT/JP2011/054938.
International Search Report/Written Opinion mailed May 17, 2011 in co-pending PCT application No. PCT/JP2011/054942.
International Preliminary Report on Patentability issued Oct. 2, 2012 in co-pending PCT application No. PCT/JP2011/054942.
International Search Report/Written Opinion mailed Jun. 7, 2011 in co-pending PCT application No. PCT/JP2011/054934.
International Preliminary Report on Patentability mailed Oct. 11, 2012 in co-pending PCT application No. PCT/JP2011/054934.
International Search Report/Written Opinion mailed May 17, 2011 in co-pending PCT application No. PCT/JP2011/054941.
International Preliminary Report on Patentability issued Oct. 2, 2012 in co-pending PCT application No. PCT/JP2011/054941.
International Search Report mailed May 10, 2011 in co-pending PCT application No. PCT/JP2011/055111.
International Search Report/Written Opinion mailed May 17, 2011 in co-pending PCT application No. PCT/JP2011/053710.
International Preliminary Report on Patentability issued Oct. 2, 2012 in co-pending PCT application No. PCT/JP2011/053710.
International Search Report/Written Opinion mailed May 24, 2011 in co-pending PCT application No. PCT/JP2011/054777.
International Preliminary Report on Patentability issued Oct. 2, 2012 in co-pending PCT application No. PCT/JP2011/054777.
International Search Report mailed May 24, 2011 in co-pending PCT application No. PCT/JP2011/054781.
Written Opinion mailed Jun. 24, 2011 in co-pending PCT application No. PCT/JP2011/054781.
International Preliminary Report on Patentability mailed Oct. 11, 2012 in co-pending PCT application No. PCT/JP2011/054781.
International Search Report/Written Opinion mailed May 24, 2011 in co-pending PCT application No. PCT/JP2011/054779.
International Preliminary Report on Patentability issued Oct. 2, 2012 in co-pending PCT application No. PCT/JP2011/054779.
Electrochimica Acta, vol. 51, 2006, pp. 5581-5586, "Preparation and electrochemical properties of LiCoO2—LiNi0.5Mn0.5O2—Li2MnO3 solid solutions with high Mn contents", Sun, et al.
International Preliminary Report on Patentability mailed Oct. 10, 2013 in co-pending PCT application No. PCT/JP0212/057974.
Office Action mailed Dec. 4, 2013 in co-pending U.S. Appl. No. 13/508,880.
Office Action mailed Dec. 18, 2013 in co-pending U.S. Appl. No. 13/514,080.
Final Rejection mailed Jan. 9, 2014 in co-pending U.S. Appl. No. 13/576,548.
Notice of Allowance mailed Nov. 6, 2013 in U.S. Appl. No. 13/582,091, now U.S. Pat. No. 8,623,551.
Int. J. Electrochem. Sci., vol. 4, 2009, pp. 1770-1778, "Improved High Rate Cycling of Li-rich Li(1.10)Ni(1/3)Co(1/3)Mn(1/3)O(2) Cathode for Lithium Batteries", Santhanam, et al.
Notice of Allowance mailed Mar. 20, 2014 in co-pending U.S. Appl. No. 13/258,120.
Final Rejection mailed Feb. 27, 2014 in co-pending U.S. Appl. No. 13/856,514.
Final Rejection mailed Jan. 27, 2014 in co-pending U.S. Appl. No. 13/581,546.
Final Rejection mailed Jan. 24, 2014 in co-pending U.S. Appl. No. 13/582,067.
Final Rejection mailed Jan. 27, 2014 in co-pending U.S. Appl. No. 13/581,814.
Final Rejection mailed Feb. 20, 2014 in co-pending U.S. Appl. No. 13/582,096.
Final Rejection mailed Feb. 7, 2014 in co-pending U.S. Appl. No. 13/582,101.
Final Rejection mailed Feb. 18, 2014 in co-pending U.S. Appl. No. 13/582,113.
Office Action mailed Jun. 10, 2013 in co-pending U.S. Appl. No. 13/508,887.
Office Action mailed Jul. 16, 2013 in co-pending U.S. Appl. No. 13/514,080.
Office Action mailed Jul. 29, 2013 in co-pending U.S. Appl. No. 13/576,548.
Office Action mailed Aug. 1, 2013 in co-pending U.S. Appl. No. 13/581,546.
Office Action mailed Jul. 17, 2013 in co-pending U.S. Appl. No. 13/581,814.
Office Action mailed Jun. 19, 2013 in co-pending U.S. Appl. No. 13/582,096.
Office Action mailed Jul. 12, 2013 in co-pending U.S. Appl. No. 13/582,101.
Office Action mailed Jul. 15, 2013 in co-pending U.S. Appl. No. 13/582,113.
Office Action mailed Aug. 13, 2013 in co-pending U.S. Appl. No. 13/582,067.
International Preliminary Report on Patentability mailed Sep. 26, 2013 in co-pending PCT application No. PCT/JP2011/053271.
International Preliminary Report on Patentability mailed Oct. 10, 2013 in corresponding PCT application No. PCT/JP2011/072860.
International Preliminary Report on Patentability mailed Aug. 1, 2013 in co-pending PCT application No. PCT/JP2011/069042.
Japanese Communication mailed Oct. 1, 2013 in co-pending Japanese patent application No. JP 2012-503253.
Japanese Communication mailed Oct. 1, 2013 in co-pending Japanese patent application No. JP 2012-503255.
Japanese Communication mailed Oct. 1, 2013 in co-pending Japanese patent application No. JP 2012-503252.
International Preliminary Report on Patentability mailed Jun. 13, 2013 in co-pending PCT application No. PCT/JP2011/066722.
International Search Report mailed Jun. 5, 2012 in co-pending PCT application No. PCT/JP2012/057974.
International Journal of Inorganic Materials 3 (2001), pp. 323-329, "Structural and electrochemical properties of Li—Ni—Co oxides synthesized by wet chemistry via a succinic-acid-assisted technique", Castro-Garcia, et al.
Office Action mailed Oct. 3, 2013 in co-pending U.S. Appl. No. 13/258,120.
Final Rejection mailed Sep. 19, 2013 in co-pending U.S. Appl. No. 13/508,887.
Office Action mailed Sep. 17, 2013 in co-pending U.S. Appl. No. 13/856,514.
International Preliminary Report on Patentability mailed Jul. 31, 2014 in co-pending PCT application No. PCT/JP2012/074263.
International Preliminary Report on Patentability mailed Jul. 31, 2014 in co-pending PCT application No. PCT/JP2012/074266.

(56) References Cited

OTHER PUBLICATIONS

Journal of the Electrochemical Society, 151 (11), 2004, pp. A1899-A1904, "Synthesis, Thermal, and Electrochemical Properties of AlPO4-Coated LiNi0.8Co0.1Mn0.1O2 Cathode Materials for Li-Ion Cell", Cho, et al.
Journal of The Electrochemical Society, 155 (3), 2008, pp. A239-A245, "Storage Characteristics of LiNi0.8Co0.1+xMn0.1-xO2 (x=0, 0.03, and 0.06) Cathode Materials for Lithium Ion Batteries", EOM, et al.
Final Rejection mailed Sep. 18, 2014 in co-pending U.S. Appl. No. 13/508,887.
Office Action mailed Sep. 18, 2014 in co-pending U.S. Appl. No. 13/856,514.
Office Action mailed Sep. 9, 2014 in co-pending U.S. Appl. No. 13/514,080.
Office Action mailed Oct. 2, 2014 in co-pending U.S. Appl. No. 13/582,089.
Office Action mailed Oct. 3, 2014 in co-pending U.S. Appl. No. 13/581,730.
European communication dated Oct. 27, 2014 in co-pending European patent application No. EP 10839166.5.
European communication dated Nov. 5, 2014 in co-pending European patent application No. EP 11856183.6.
European communication dated Oct. 20, 2014 in co-pending European patent application No. EP 12763420.2.
Office Action mailed Nov. 5, 2014 in co-pending U.S. Appl. No. 13/582,087.
Office Action mailed Nov. 14, 2014 in co-pending U.S. Appl. No. 13/582,096.
Japanese communication mailed Apr. 7, 2015 in co-pending Japanese patent application No. 2012-503258.
International Preliminary Report on Patentability mailed Mar. 19, 2015 in co-pending PCT application No. PCT/JP2013/064941.
International Preliminary Report on Patentability mailed Apr. 2, 2015 in co-pending PCT application No. PCT/JP2013/076598.
Wikipedia, Karl Fischer Titration article, Waybackmachine.com snapshot dtd., Sep. 12, 2010, 2 pages.
Office Action mailed Mar. 25, 2015 in co-pending U.S. Appl. No. 13/581,423.
Office Action mailed Mar. 18, 2015 in co-pending U.S. Appl. No. 13/816,822.
Office Action mailed Apr. 3, 2015 in co-pending U.S. Appl. No. 13/822,447.
Office Action mailed Apr. 23, 2015 in co-pending U.S. Appl. No. 14/364,795.
Office Action mailed Apr. 3, 2015 in co-pending U.S. Appl. No. 14/364,809.
Office Action mailed Apr. 3, 2015 in co-pending U.S. Appl. No. 14/364,830.
Office Action mailed Feb. 25, 2015 in co-pending U.S. Appl. No. 13/508,880.
Final Rejection mailed Feb. 27, 2015 in co-pending U.S. Appl. No. 13/581,730.
Office Action mailed Feb. 26, 2015 in co-pending U.S. Appl. No. 13/582,101.
Office Action mailed Feb. 26, 2015 in co-pending U.S. Appl. No. 13/582,113.
Office Action mailed May 14, 2015 in co-pending U.S. Appl. No. 13/984,947.
European Communication dated Jan. 5, 2015 in corresponding European patent application No. 11842456.3.
European Communication dated Dec. 9, 2014 in co-pending European patent application No. 11750768.1.
European Communication dated Dec. 9, 2014 in co-pending European patent application No. 11750762.4.
European Communication dated Feb. 17, 2015 in co-pending European patent application No. 11865511.7.
Chinese Communication dated Jan. 12, 2015 in co-pending Chinese patent application No. 201280004477.6.
International Search Report mailed Jan. 7, 2014 in co-pending PCT application No. PCT/JP2013/076598.
Journal of the The Electrochemical Society, vol. 151, No. 10, Sep. 2004, pp. A1707-A1711, "Comparison of Overcharge Behavior of AlPO4-Coated LiCoO2 and LiNi0.8Co0.1Mn0.1O2 Cathode Materials in Li-Ion Cells", Cho, et al.
Journal of Power Sources, vol. 146, 2005, pp. 39-44, "Performance of LiNiCoO2 materials for advanced lithium-ion batteries", Itou, et al.
Ceramics International, vol. 35, No. 4, May 2009, pp. 1633-1639, "Fine-sized LiNi0.8Co0.15Mn0.05O2 cathode particles prepared by spray pyrolysis from the polymeric precursor solutions", Ju, et al.
Journal of Alloys and Compounds, vol. 469, No. 1-2, Feb. 2009, pp. 304-309, "Effects of the ratio of manganese and nickel components on the characteristics of Lix(MnyNi1-y)Oz cathode powders prepared by spray pyrolysis", Ju, et al.
Journal of Power Sources, vol. 153, No. 2, Feb. 2006, pp. 345-349, "Improvement of 12V overcharge behavior of LiCoO2 cathode material by LiNi0.8Co0.1Mn0.1O2 addition in a Li-ion cell", Kim, et al.
Journal of Applied Electrochemistry, vol. 38, No. 5, Jan. 2008, pp. 613-617, "Comparative study of the preparation and electrochemical performance of LiNi1/2Mn1/2O2 electrode material for rechargeable lithium batteries", Lian, et al.
Notice of Allowance mailed Jan. 15, 2015 in co-pending U.S. Appl. No. 13/514,080.
Final Rejection mailed Jan. 23, 2015 in co-pending U.S. Appl. No. 13/576,548.
Final Rejection mailed Jan. 28, 2015 in co-pending U.S. Appl. No. 13/576,753.
Office Action—Restriction—mailed Jan. 26, 2015 in co-pending U.S. Appl. No. 13/581,423.
Final Rejection mailed Feb. 12, 2015 in co-pending U.S. Appl. No. 13/582,089.
Final Rejection mailed Feb. 13, 2015 in co-pending U.S. Appl. No. 13/582,087.
Final Rejection mailed Jul. 29, 2015 in co-pending U.S. Appl. No. 13/508,880.
Notice of Allowance mailed Jun. 30, 2015 in co-pending U.S. Appl. No. 13/576,548.
Notice of Allowance mailed May 20, 2015 in co-pending U.S. Appl. No. 13/582,087.
Final Rejection mailed Jun. 23, 2015 in co-pending U.S. Appl. No. 13/582,096.
Final Rejection mailed Jul. 1, 2015 in co-pending U.S. Appl. No. 13/582,101.
Final Rejection mailed Jun. 30, 2015 in co-pending U.S. Appl. No. 13/582,113.
Final Rejection mailed Jun. 24, 2015 in co-pending U.S. Appl. No. 13/816,822.
Notice of Allowance mailed Sep. 10, 2015 in co-pending U.S. Appl. No. 13/582,096.
Notice of Allowance mailed Sep. 22, 2015 in co-pending U.S. Appl. No. 13/582,096.
Notice of Allowance mailed Oct. 22, 2015 in co-pending U.S. Appl. No. 13/582,101.
Notice of Allowance mailed Oct. 22, 2015 in co-pending U.S. Appl. No. 13/582,113.
Notice of Allowance mailed Oct. 21, 2015 in co-pending U.S. Appl. No. 13/984,947.
Notice of Allowance mailed Sep. 8, 2015 in co-pending U.S. Appl. No. 14/364,795.
Notice of Allowance mailed Sep. 10, 2015 in co-pending U.S. Appl. No. 14/364,809.

\* cited by examiner

METHOD FOR PRODUCING POSITIVE ELECTRODE ACTIVE MATERIAL FOR LITHIUM ION BATTERIES AND POSITIVE ELECTRODE ACTIVE MATERIAL FOR LITHIUM ION BATTERIES

TECHNICAL FIELD OF THE INVENTION

The present invention relates to a method for producing a positive electrode active material for lithium ion batteries and a positive electrode active material for lithium ion batteries.

BACKGROUND OF THE INVENTION

As a positive electrode active material for lithium ion batteries, a lithium transition metal composite oxide is well known. The lithium transition metal composite oxide is produced as described, for example, in Patent document 1 in such a manner that a lithium compound and a transition metal compound are mixed to prepare a precursor for positive electrode active material for lithium ion batteries and, after that, the mixture is fired to form a composite.

A lithium ion battery is, from the uses thereof, used over a long period of time, and, because charge and discharge are repeated, various kinds of characteristics such as the cycle characteristics and storage characteristics are required, and high capacity of very high level is being demanded. Further, as a market for lithium batteries for use in consumer equipment such as portable telephones and personal computers and for use in automobiles expands, it is demanded to produce lithium ion batteries at low cost and with high efficiency.

In a step of producing lithium ion batteries like this, as described above, it is necessary to fire a precursor for positive electrode active material for lithium ion batteries to form a composite. In such a step of firing, generally, a method where a firing vessel in which the precursor is filled is set inside of a firing furnace (static furnace) and heated according to a conveyer method or a batch method is in use.
(Patent document 1) Japanese Patent No. 3334179

SUMMARY OF THE INVENTION

However, a fired body prepared in such a manner is usually flocculated and forms a block. Accordingly, in order to use as a positive electrode active material, a step of crushing into powder is necessary. Since a crusher is necessary in the step of crushing, it increases costs by that amount and also causes a decrease in production efficiency.

The invention intends to provide a method for producing a high quality positive electrode active material for lithium ion batteries at low cost and at excellent production efficiency.

The present inventors have found, after studying hard that, in the step of firing a precursor for positive electrode active material for lithium ion batteries, when a precursor is heated at a low temperature of about 300° C. before firing at a high temperature, a liquid phase is generated inside thereof, thereby moisture is generated inside of the precursor to result in flocculating to form a block. And in order to avoid the low temperature heating before firing like this, it was also found that when a rotary kiln is used to fire and a temperature at a powder feed part of the precursor inside of the rotary kiln is maintained at 500° C. or more, the precursor charged inside of the rotary kiln is immediately heated to 500° C. or more, thereby high temperature firing can be conducted without forming a liquid phase. A fired body fired at a high temperature of 500° C. or more without forming a liquid phase like this does not flocculate to form a block, thereby the step of crushing after that is not necessary.

The invention completed based on the above findings is, in an aspect, a method for producing a positive electrode active material for lithium ion batteries that includes a step of firing a powder of lithium-containing carbonate that is a precursor for positive electrode active material for lithium ion batteries in a rotary kiln, in the step a temperature at a powder feed part inside of the rotary kiln being kept at 500° C. or more.

In an embodiment of the method for producing a positive electrode active material for lithium ion batteries related to the invention, a temperature of the powder at a position where the powder feeding into the rotary kiln is started is kept at 150° C. or lower.

In another embodiment of the method for producing a positive electrode active material for lithium ion batteries related to the invention, a rotary block where at least 3 blades are formed is set inside of the rotary kiln, and, with at least one of 3 blades of the rotary block brought into contact with an inner wall of the rotary kiln, the positive electrode active material is fired by the rotary kiln.

In still another embodiment of the method for producing a positive electrode active material for lithium ion batteries related to the invention, a plurality of the rotary blocks are set inside of the rotary kiln in parallel in a longitude direction of the rotary kiln.

In another embodiment of the method for producing a positive electrode active material for lithium ion batteries related to the invention, an apex of the blade of the rotary block is formed into a concavo-convex shape.

In still another embodiment of the method for producing a positive electrode active material for lithium ion batteries related to the invention, the positive electrode active material is represented by a compositional formula: $Li_xNi_{1-y}M_yO_{2+\alpha}$ (In the formula, M is one or more kinds selected from Sc, Ti, V, Cr, Mn, Fe, Co, Cu, Zn, Ga, Ge, Al, Bi, Sn, Mg, Ca, B and Zr, $0.9 \le x \le 1.2$, $0 < y \le 0.7$, and $0.05 \le \alpha$).

In another embodiment of the method for producing a positive electrode active material for lithium ion batteries related to the invention, M is one or more kinds selected from Mn and Co.

The invention is in another aspect a positive electrode active material for lithium ion batteries, which is represented by a compositional formula: $Li_xNi_{1-y}M_yO_{2+\alpha}$
(In the formula, M is one or more kinds selected from Sc, Ti, V, Cr, Mn, Fe, Co, Cu, Zn, Ga, Ge, Al, Bi, Sn, Mg, Ca, B and Zr, $0.9 \le x \le 1.2$, $0 < y \le 0.7$, and $0.05 \le \alpha$) and has the tap density of 1.8 to 2.2 g/cc.

In one embodiment of the positive electrode active material for lithium ion batteries related to the invention, M is one or more kinds selected from Mn and Co.

Advantageous Effect of the Invention

According to the invention, a method for producing a high quality positive electrode active material for lithium ion batteries at low cost and at excellent production efficiency can be provided.

Figure 1:
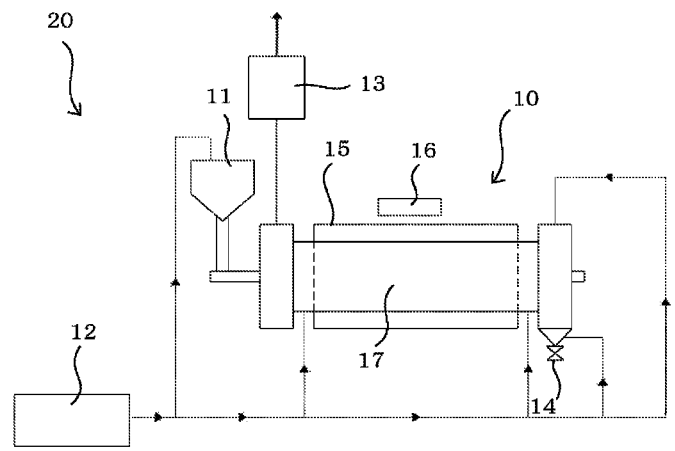
FIG. 1 is a schematic diagram of a firing equipment.

DESCRIPTION OF THE PREFERRED EMBODIMENTS (Constitution of Positive Electrode Active Material for Lithium Ion Batteries)

As a raw material of positive electrode active material for lithium ion batteries produced in the invention, compounds useful as a general positive electrode active material for positive electrodes for lithium ion batteries can be broadly used. However, lithium-containing transition metal oxides such as lithium cobalt oxide ($LiCoO_2$), lithium nickel oxide ($LiNiO_2$) and lithium manganese oxide ($LiMn_2O_4$) can be preferably used. The positive electrode active material for lithium ion batteries produced with the materials described above is represented by, for example, a compositional formula: $Li_xNi_{1-y}M_yO_{2+\alpha}$
(In the formula, M is one or more kinds selected from Sc, Ti, V, Cr, Mn, Fe, Co, Cu, Zn, Ga, Ge, Al, Bi, Sn, Mg, Ca, B and Zr, $0.9 \leq x \leq 1.2$, $0 < y \leq 0.7$, and $0.05 \leq \alpha$).

A ratio of lithium to all metals in the positive electrode active material for lithium ion batteries is 0.9 to 1.2. This is because when the ratio is less than 0.9, a stable crystal structure is difficult to maintain, and when the ratio is more than 1.2, the capacity becomes low.

In the positive electrode active material for lithium ion batteries of the invention, oxygen is excessively contained as shown as $O_{2+\alpha}$ (and $0.05 \leq \alpha$) in the above compositional formula. When the positive electrode active material is used in lithium ion batteries, battery characteristics such as capacity, rate characteristics and capacity retention rate become excellent. Here, the α is preferably larger than 0.10, more preferably larger than 0.15, and typically $0.05 \leq \alpha \leq 0.25$.

Further, in the compositional formula of the positive electrode active material for lithium ion batteries of the invention, M is preferable to be one or more kinds selected from Mn and Co.

Further, the tap density of the positive electrode active material for lithium ion batteries of the invention is 1.8 to 2.2 g/cc. When the positive electrode active material is used in lithium ion batteries, battery characteristics such as capacity, rate characteristics and capacity retention rate become excellent. So far, when lithium-containing carbonate that is a precursor is fired only in a static furnace, since the precursor is sparse between particles, it was difficult to improve the tap density. According to the invention, by calcining the lithium-containing carbonate that is a precursor while flowing in the rotary kiln, particles are granulated with each other to be dense, thereby the tap density is improved.

(Method for Producing Positive Electrode Active Material for Lithium Ion Batteries)

Next, a method for producing a positive electrode active material for lithium ion batteries related to an embodiment of the invention will be described in detail. Firstly, a metal salt solution is prepared. The metal is Ni, and one or more kinds selected from Sc, Ti, V, Cr, Mn, Fe, Co, Cu, Zn, Ga, Ge, Al, Bi, Sn, Mg, Ca, B and Zr. Further, the metal salt is sulfate, chloride, nitrate or acetate, and the nitrate is particularly preferable. This is because even when the nitrate is mixed in a firing raw material as an impurity, it can be fired as it is to result in dispensing with the step of washing, and the nitrate works as an oxidizing agent to promote oxidation of metals in the firing raw material. Each of the metals contained in the metal salt is adjusted to be a desired molar ratio. Thereby, a molar ratio of each of the metals in the positive electrode active material is determined.

Next, lithium carbonate is suspended in pure water, after that, a metal salt solution of the metal is poured therein to prepare a slurry of lithium salt solution. At this time, fine particulate lithium-containing carbonate is segregated in the slurry. When the lithium compound does not react during heating sulfate or chloride as the metal salt, the lithium compound is, after washing with a saturated solution of lithium carbonate, filtered off. When, like nitrate or acetate, the lithium compound thereof reacts as a lithium raw material during heat treatment, it is, without washing, filtered off as it is, and dried, thereby it can be used as a fired precursor.

Then, the filtered lithium-containing carbonate is dried, a powder of a composite of lithium salt (precursor for positive electrode active material for lithium ion batteries) is obtained.

Next, a firing equipment 20 such as shown in FIG. 1 is prepared. The firing equipment 20 includes a rotary kiln 10, a powder feeder 11, a gas feeder 12, a bag filter 13 and a powder exhaust part 14.

The rotary kiln 10 includes a furnace core tube 17, an external cylinder 15 formed by surrounding the furnace core tube 17, and a heater 16 that is set outside of the external cylinder 15 and heats the furnace core tube 17. The furnace core tube 17 is formed with predetermined inner diameter and length depending on an amount of the precursor to be fired and a firing time. For example, the furnace core tube 17 having the inner diameter of 125 to 3500 mm and a total length of 1 to 30 m can be used.

Figure 2:
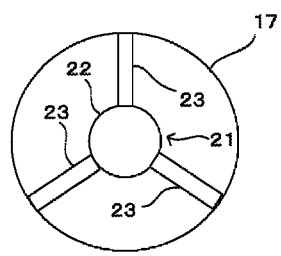
FIG. 2 is a pattern diagram of a rotary block in a furnace core tube.
Figure 3:
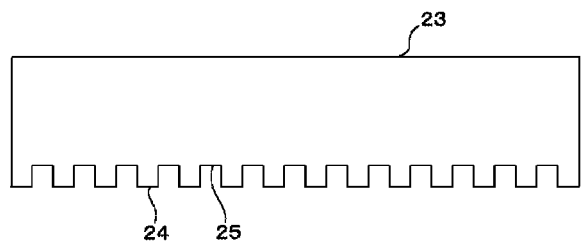
FIG. 3 is a plan view of a blade of the rotary block.

The furnace core tube 17 is provided with a rotary block 21 as shown in FIG. 2 and having 3 blades for stirring the powder to be fired. The rotary block 21 includes a columnar body 22 that extends in a longitudinal direction of the furnace core tube 17 and has a predetermined length, and blades 23 each formed so as to erect from a surface of the columnar body 22 and to extend in a longitudinal direction of the furnace core tube 17. The rotary block 21 may well be provided with at least 3 blades, and 4 or more blades may be provided. FIG. 3 shows a plan view of the blades 23 of the rotary block 21. Each of the blades 23 of the rotary block 21 has a plurality of convex parts 24 and concave parts 25 alternately formed at an apex thereof. When the apex of the blade 23 of the rotary block 21 is formed in a concavo-convex shape, the precursor stuck onto an inner wall of the furnace core tube 17 can be more excellently scraped. The rotary block 21 is set plurally in parallel in a longitudinal direction of the rotary kiln 10. When the rotary block 21 is plurally set in parallel like this, the precursor can be stirred by the rotary block 21 inside of the furnace core tube 17 and the precursor stuck onto the inner wall of the furnace core tube 17 can be scraped with higher degree of freedom, and thereby the precursor can be excellently inhibited from flocculating. The rotary block 21 may be set by only one inside of the rotary kiln 10. The furnace core tube 17 is preferably formed of a material that excellently conducts heat from the heater 16 and does not generate a contaminating substance that may mingle with the precursor. For example, Ni, Ti, stainless or ceramic can be used to form. Also the external cylinder 15 is preferably formed of a material that excellently conducts heat from the heater 16, for example, Ni, Ti, stainless or ceramic can be used to form. The heater 16 is not particularly restricted in its position as long as the position is outside of the external cylinder 15. Further, in FIG. 1, the heater 16 is set at one position. However, the heater 16 may be set at a plurality of positions. The rotary kiln 10 inclines so as to come down from an anterior part to a posterior part. Thereby, the precursor charged from the anterior part moves backward during firing. An angle of inclination is not particularly restricted and can be determined depending on a firing time.

In a powder feeder 11, a precursor to be fired is set inside thereof. The powder feeder 11 is connected to an anterior part (powder feeding part) of the rotary kiln 10 and therefrom the precursor is fed to the anterior part. The powder feeder 11 is, in order to inhibit heat from conducting from the rotary kiln 10 heated to a high temperature to fire the precursor, set distanced by a predetermined distance from the anterior part of the rotary kiln 10.

The powder exhaust part 14 is set at a posterior part of the rotary kiln 10. From the powder exhaust part 14, a powder (fired body) fired by going through the furnace core tube 17 is exhausted.

The gas feeder 12 feeds a gas that circulates inside of a firing equipment 20.

From the gas feeder 12, an inert gas such as nitrogen or argon, and oxygen are fed. A pathway shown with an arrow mark in FIG. 1 is a circulation pathway of gas fed from the gas feeder 12.

The bag filter 13 is set at an anterior part of the rotary kiln 10. The bag filter 13 recovers the precursor mingled in an exhaust gas. The bag filter 13 uses a woven-fabric or non-woven fabric as a filtering material and is formed by superposing these cylindrically.

Figure 4:
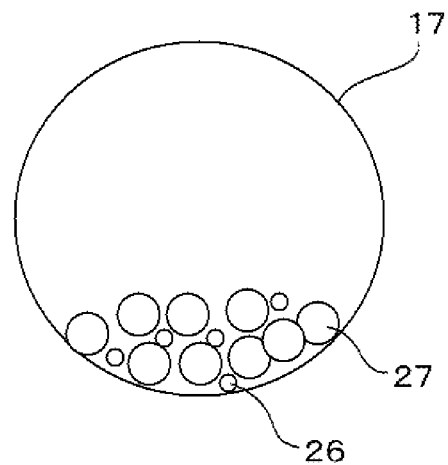
FIG. 4 is a pattern diagram of metal balls plurally set in the furnace core tube.
Figure 5:
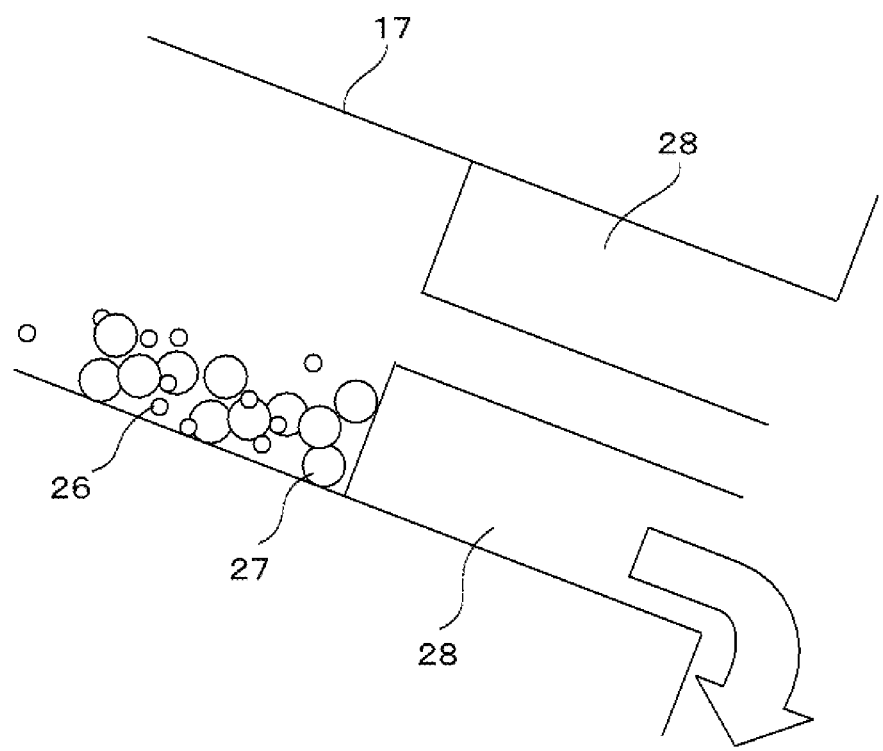
FIG. 5 is a pattern diagram at a posterior part of an inner wall of the furnace core tube provided with a classifying filter.

According to the embodiment, the stirring of the precursor and the scraping of the precursor stuck onto the inner wall of the furnace core tube 17 are conducted with the rotary block 21 set inside of the furnace core tube 17. However, without restricting thereto, a metal ball 27 as shown, for example, in FIG. 4 may be used. At this time, the metal ball 27 is plurally set inside of the furnace core tube 17, and, as the furnace core tube 17 rotates, these balls 27 and the precursor 26 rotate to collide with each other. Thereby, the metal balls 27 can disintegrate and well stir the precursor 26, and further can excellently scrape the precursor 26 stuck to the inner wall of the furnace core tube 17. When the metal ball 27 is composed of, for example, zirconia, alumina, or silicon nitride, the media material can preferably have an advantage that the melting temperature thereof is higher than a firing temperature in the rotary kiln. Further, as shown in FIG. 5, a classifying filter 28 for classifying the precursor 26 disintegrated by the metal balls 27 may be set along an end part of the inner wall of the furnace core tube 17. The classifying filter 28 may be, for example, a cancellous metallic filter made of titanium, in which a plurality of classifying holes having a pore diameter of predetermined magnitude is formed.

As the step of firing, firstly, while rotating the furnace core tube 17, the heater 16 is used to start heating. Here, depending on the firing time and firing temperature to a mass of a precursor for a positive electrode active material for lithium ion batteries to be fed later, an angle of inclination and a rotating speed of the furnace core tube 17 are determined. For example, when a mass of the precursor is 20 to 110 g, the firing time is 0.5 to 48 hr, and the firing temperature is 700 to 1200° C., the angle of inclination of the furnace core tube 17 can be set at 8 to 15° and the rotating speed can be set at 3.6 to 9.6 rad/sec. At this time, the powder feeder 11 located at a position where the precursor is begun to feed into the rotary kiln 10 is, in order to avoid to receive heat from the rotary kiln 10 at a high temperature for heating the precursor, separated by a predetermined distance from the anterior part of the rotary kiln 10, and the temperature of the powder therein is maintained at 150° C. or less. Accordingly, the precursor can be excellently inhibited from being heated before feeding the precursor into the rotary kiln 10 to generate a liquid phase that later causes the flocculation.

Next, when the temperature inside of the furnace core tube 17 goes up to 500 to 1200° C., in particular, the anterior part (powder feeder) of the furnace core tube 17 goes up to 500° C. or more, while maintaining the temperature, a precursor for positive electrode active material for lithium ion batteries is fed from the powder feeder 11 to the anterior part (powder feeder) of the furnace core tube 17. Accordingly, the precursor fed into the rotary kiln 10 is, without being immediately heated at 500° C. or more to form a liquid phase, heated at a high temperature.

The precursor for positive electrode active material for lithium ion batteries which is fed is, while being stirred and heated inside of the rotating furnace core tube 17, transported to the posterior part of the furnace core tube 17. At this time, the rotary block 21 moves, as the rotary kiln 10 rotates, in a direction the same as a direction of the rotation and thereafter rotates. During this, the blade 23 of the rotary block 21 is in contact with the inner wall of the furnace core tube 17 at an apex thereof, the precursor inside of the furnace core tube 17 is, after once being scraped up by the blade 23, dropped downward. Further, the blade 23 of the rotary block 21 stirs and disintegrates the precursor inside of the furnace core tube 17 like this and scrapes down the precursor stuck to the inner wall of the furnace core tube 17. Accordingly, the precursor does not flocculate to solidify inside of the furnace core tube 17, the prepared precursor becomes excellent powder, and the step of crushing after that becomes unnecessary. Further, during the firing, powder of the precursor and so on exhausted from the furnace core tube 17 together with a feed gas is recovered with a bag filter 13. The precursor recovered by the bag filter 13, after purification, may be used as a raw material again.

Thereafter, the fired body is exhausted from a powder exhaust part 14 to outside of the equipment.

EXAMPLES

In what follows, examples will be provided to promote better understanding of the invention and advantages thereof. However, the invention is not restricted to the examples.

Examples 1 to 13

Firstly, lithium carbonate of a charging amount described in Table 1 was suspended in 3.2 L of pure water, thereafter, 4.8 L of a solution of metal salts was poured therein. Here, the solution of metal salts was prepared in such a manner that hydrates of nitrate of the respective metals were adjusted so that the respective metals were a composition ratio described in Table 1 and a total mole number of the metals was 14 moles.

An amount of lithium carbonate suspension is an amount where x is a value of Table 1 when a product (a positive electrode active material for lithium ion secondary batteries, that is, a positive electrode active material) is represented by $Li_xNi_{1-y}M_yO_{2+\alpha}$, and each thereof was calculated according to the following equation.

$$W(g) = 73.9 \times 14 \times (1 + 0.5X) \times A$$

In the equation, "A" is a numerical value multiplied to subtract in advance, in addition to an amount of necessary as a precipitation reaction, an amount of lithium due to the lithium compound other than lithium carbonate remaining in the raw material after filtration, from a suspension amount. The "A" is 0.9 when a lithium salt reacts with a firing raw material like nitrate and acetate, and 1.0 when a lithium salt does not react with the firing raw material like sulfate and chloride.

According to the treatment, microparticulate lithium-containing carbonate precipitated in the solution and the precipitate was filtered off by use of a filter press.

Subsequently, the precipitate was dried, thereby a lithium-containing carbonate (precursor for positive electrode active material for lithium ion batteries) was obtained.

Next, a firing equipment as shown in FIG. 1 was prepared by use of a rotary kiln (manufactured by Takasago Industry Co., Ltd., furnace core tube: length 2000 mm×inner diameter 250 mm). With oxygen circulating from a gas feeder into a system, a heater was used to start heating, and the rotary kiln was rotated at a rotating speed of 9.6 rad/sec. The angle of inclination of the rotary kiln was set at 10°. Further, a powder (precursor) set in the powder feeder is set separated from the furnace core tube, and the temperature thereof was kept at the temperature described in Table 2. Then, when the temperature inside of the furnace core tube became 500 to 800° C. and the temperature of the anterior part that is a feeding part of the precursor became a temperature described in Table 2, with the temperature maintained, the precursor was charged from the powder feed part into the furnace core tube. A charging amount of the precursor was set at 110 g/min. The precursor charged into the furnace core tube was fired by stirring and transporting in the rotating furnace core tube by the rotary block. The fired body was exhausted from the powder exhaust part to outside of the equipment and visually examined whether a block was formed by flocculation or not, namely, whether the step of crushing is necessary or not.

Examples 14 and 15

As Examples 14 and 15, except that the rotary block was not used in the firing equipment, fired bodies were prepared under the condition the same as that of Examples 1 to 13 and visually examined whether a block was formed by flocculation or not, namely, whether the step of crushing is necessary or not.

Examples 16 to 18

As Examples 16 to 18, except that the temperature of the powder at the position where the charge was started was set at 200° C. or more, fired bodies were prepared under the condition the same as that of Examples 1 to 13 and visually examined whether a block was formed by flocculation or not, namely, whether the step of crushing is necessary or not.

Example 19

As Example 19, except that the respective metals of raw material were set to a composition shown in Table 1, the metal salts were selected from chlorides thereof, and after the precipitation of the lithium-containing carbonate, the precipitate was washed with a saturated solution of lithium carbonate and filtered, the treatment the same as that of Examples 1 to 13 was conducted, and resulted fired body was visually examined whether a block was formed by flocculation or not, namely, whether the step of crushing is necessary or not.

Example 20

As Example 20, except that the respective metals of raw material were set to a composition shown in Table 1, the metal salts were selected from sulfates thereof, and after the precipitation of the lithium-containing carbonate, the precipitate was washed with a saturated solution of lithium carbonate and filtered, the treatment the same as that of Examples 1 to 13 was conducted, and resulted fired body was visually examined whether a block was formed by flocculation or not, namely, whether the step of crushing is necessary or not.

Comparative Examples 1 to 5

As Comparative Examples 1 to 5, the respective metals of raw material were set to a composition shown in Table 1. Then, lithium-containing carbonates (precursors for positive electrode active material for lithium ion batteries) the same as that of Examples 1 to 13 were obtained. Then, except that the temperature of the powder feed part inside the rotary kiln was maintained at less than 500° C., the precursors were fired under the same equipment and same condition as that of Examples 1 to 13. The resulted fired bodies were visually examined whether a block was formed by flocculation or not, namely, whether the step of crushing is necessary or not.

Contents of metals in each of positive electrode materials were measured with an inductively-coupled plasma optical emission spectrometer (ICP-OES) and the composition ratio (molar ratio) of the respective metals was calculated. Further, a content of oxygen was measured by LECO method and α was calculated. As the result thereof, it was confirmed that the results are just as shown in Table 1. The tap density was a value after 200 times of tapping.

Each of the positive electrode materials, a conductive material and a binder was weighed at a ratio of 85:8:7. In a solution obtained by dissolving the binder in an organic solvent (N-methyl pyrrolidone), the positive electrode material and conductive material were mixed to form a slurry. The slurry was coated on an aluminum foil and, after drying, pressed to form a positive electrode. Then, a 2032 coin cell for use in evaluation, in which Li is used as a counter electrode was prepared, and, with a solution obtained by dissolving 1 M-LiPF$_6$ in EC-DMC (1:1) as an electrolytic solution, the discharge capacity when a current density is 0.2 C was measured. Further, a ratio of discharge capacity under the current density of 2 C to the battery capacity when the current density is 0.2 C was calculated and thereby the rate characteristics were obtained. Further, the capacity retention rate was measured by comparing the initial discharge capacity obtained under a discharge current of 1 C at room temperature to the discharge capacity after 100 cycles.

The test condition and results are shown in Tables 1 and 2.

TABLE 1

| | amount of lithium carbonate suspension | composition ratio of each metal in all metals except Li | | | | | | | | | | |
|---|---|---|---|---|---|---|---|---|---|---|---|---|
| | (g) | Ni | Co | Mn | Ti | Cr | Fe | Cu | Al | Sn | Mg | x | α |
| Example 1 | 1396.7 | 33.3 | 33.3 | 33.3 | | | | | | | | 1.0 | 0.15 |
| Example 2 | 1443.3 | 33.3 | 33.3 | 33.3 | | | | | | | | 1.1 | 0.09 |
| Example 3 | 1350.2 | 33.3 | 33.3 | 33.3 | | | | | | | | 0.9 | 0.09 |
| Example 4 | 1489.8 | 33.3 | 33.3 | 33.3 | | | | | | | | 1.2 | 0.18 |

TABLE 1-continued

| | amount of lithium carbonate suspension (g) | composition ratio of each metal in all metals except Li | | | | | | | | | | |
|---|---|---|---|---|---|---|---|---|---|---|---|---|
| | | Ni | Co | Mn | Ti | Cr | Fe | Cu | Al | Sn | Mg | x | α |
| Example 5 | 1396.7 | 65 | 20 | 15 | | | | | | | | 1.0 | 0.08 |
| Example 6 | 1396.7 | 80 | 10 | 10 | | | | | | | | 1.0 | 0.06 |
| Example 7 | 1396.7 | 33 | 33 | 33 | | | | | | | 1 | 1.0 | 0.13 |
| Example 8 | 1396.7 | 80 | 15 | | 5 | | | | | | | 1.0 | 0.07 |
| Example 9 | 1396.7 | 80 | 15 | | | 5 | | | | | | 1.0 | 0.19 |
| Example 10 | 1396.7 | 80 | 15 | | | | 5 | | | | | 1.0 | 0.08 |
| Example 11 | 1396.7 | 80 | 15 | | | | | 5 | | | | 1.0 | 0.07 |
| Example 12 | 1396.7 | 80 | 15 | | | | | | 5 | | | 1.0 | 0.05 |
| Example 13 | 1396.7 | 80 | 15 | | | | | | | 5 | | 1.0 | 0.06 |
| Example 14 | 1396.7 | 33.3 | 33.3 | 33.3 | | | | | | | | 1.0 | 0.13 |
| Example 15 | 1396.7 | 33.3 | 33.3 | 33.3 | | | | | | | | 1.0 | 0.11 |
| Example 16 | 1396.7 | 33.3 | 33.3 | 33.3 | | | | | | | | 1.0 | 0.12 |
| Example 17 | 1396.7 | 33.3 | 33.3 | 33.3 | | | | | | | | 1.0 | 0.09 |
| Example 18 | 1396.7 | 33.3 | 33.3 | 33.3 | | | | | | | | 1.0 | 0.12 |
| Example 19 | 1551.9 | 33.3 | 33.3 | 33.3 | | | | | | | | 1.0 | 0.09 |
| Example 20 | 1551.9 | 33.3 | 33.3 | 33.3 | | | | | | | | 1.0 | 0.08 |
| Comparative Example 1 | 1396.7 | 33.3 | 33.3 | 33.3 | | | | | | | | 1.0 | 0.20 |
| Comparative Example 2 | 1396.7 | 33.3 | 33.3 | 33.3 | | | | | | | | 1.0 | 0.21 |
| Comparative Example 3 | 1396.7 | 33.3 | 33.3 | 33.3 | | | | | | | | 1.0 | 0.11 |
| Comparative Example 4 | 1396.7 | 33.3 | 33.3 | 33.3 | | | | | | | | 1.0 | 0.09 |
| Comparative Example 5 | 1396.7 | 80 | 15 | | | | | | 5 | | | 1.0 | 0.04 |

TABLE 2

| | temperature at a powder feed part of the powder inside of the rotary kiln (° C.) | temperature of the powder at a position where the powder feeding into the rotary kiln was started (° C.) | firing time (hour) | firing temperature (° C.) | tap density (g/cc) | discharge capacity (mAh/g) | rate characteristics (%) | capacity retention rate (%) |
|---|---|---|---|---|---|---|---|---|
| Example 1 | 600 | 50 | 12 | 1050 | 1.8 | 154 | 91 | 91 |
| Example 2 | 800 | 150 | 0.5 | 1200 | 2.2 | 151 | 89 | 86 |
| Example 3 | 500 | 30 | 12 | 1070 | 1.9 | 153 | 91 | 87 |
| Example 4 | 600 | 120 | 6 | 1070 | 2.1 | 151 | 90 | 89 |
| Example 5 | 600 | 80 | 12 | 1000 | 2.1 | 170 | 88 | 86 |
| Example 6 | 500 | 80 | 36 | 770 | 1.9 | 184 | 85 | 81 |
| Example 7 | 650 | 70 | 12 | 1050 | 2.0 | 153 | 91 | 89 |
| Example 8 | 650 | 120 | 48 | 700 | 1.7 | 186 | 86 | 82 |
| Example 9 | 650 | 120 | 48 | 700 | 1.7 | 188 | 84 | 82 |
| Example 10 | 600 | 90 | 48 | 730 | 1.9 | 183 | 83 | 81 |
| Example 11 | 600 | 80 | 36 | 780 | 2.1 | 181 | 84 | 81 |
| Example 12 | 650 | 80 | 36 | 770 | 1.9 | 189 | 89 | 82 |
| Example 13 | 600 | 80 | 48 | 720 | 1.8 | 184 | 85 | 83 |
| Example 14 | 750 | 120 | 12 | 1050 | 2.0 | 155 | 92 | 89 |
| Example 15 | 750 | 120 | 12 | 1070 | 2.1 | 154 | 91 | 89 |
| Example 16 | 500 | 200 | 12 | 1050 | 1.8 | 152 | 88 | 89 |
| Example 17 | 700 | 300 | 12 | 1070 | 1.8 | 151 | 89 | 87 |
| Example 18 | 800 | 350 | 12 | 1050 | 1.9 | 153 | 89 | 88 |
| Example 19 | 650 | 80 | 24 | 1070 | 1.9 | 151 | 87 | 85 |
| Example 20 | 650 | 80 | 24 | 1050 | 1.8 | 151 | 86 | 86 |
| Comparative Example 1 | 100 | 30 | 12 | 1000 | 1.4 | 149 | 88 | 83 |
| Comparative Example 2 | 200 | 30 | 24 | 980 | 1.3 | 149 | 87 | 82 |
| Comparative Example 3 | 400 | 40 | 12 | 1070 | 1.7 | 151 | 88 | 83 |
| Comparative Example 4 | 450 | 50 | 12 | 1070 | 1.8 | 152 | 89 | 85 |
| Comparative Example 5 | 300 | 40 | 36 | 770 | 1.7 | 177 | 82 | 78 |

(Evaluation)

In all of Examples 1 to 20, the tap density and battery characteristics were excellent.

Among these, in Examples 14 and 15, the rotary block was not used in the rotary kiln. As the result thereof, in comparison with Examples 1 to 13 where the firing was more homogeneously conducted with the rotary block, the battery characteristics were poor.

Further, in Examples 16 to 18, the temperature of the powder at a position where the powder feeding was started was set to 200° C. or more. As the result thereof, in comparison with Examples 1 to 13 where the corresponding temperature was set to 150° C. or lower and thereby the precursor is inhibited from being heated before charging into the rotary kiln to generate a liquid phase that cause flocculation thereafter, the battery characteristics were poor.

Still further, in Examples 19 and 20, chloride and sulfate were used as the metal salt of each of the raw materials. Accordingly, in comparison with Examples 1 to 13 where, by use of the nitrate in a raw material, the nitrate works as an oxidant to promote oxidation of metals in the firing raw material, the battery characteristics were poor.

In Comparative Examples 1 to 5, the temperature of the powder feed part inside of the rotary kiln was maintained lower than 500° C. Accordingly, the precursor charged into the rotary kiln was considered not immediately heated at a high temperature to have generated a liquid phase. Thereby, the battery characteristics thereof were poorly compared with that of Examples 1 to 13.

EXPLANATION OF REFERENCE NUMBERS 10 rotary kiln
11 powder feeder
12 gas feeder
13 bag filter
14 powder exhaust part
15 external cylinder
16 heater
17 furnace core tube
20 firing equipment
21 rotary block
22 columnar body
23 blade
24 convex part
25 concave part
26 precursor
27 metal ball
28 classifying filter

What is claimed is:

1. A method for producing a positive electrode active material for lithium ion batteries, comprising:
    firing a powder of lithium-containing carbonate that is a precursor for positive electrode active material for lithium ion batteries in a rotary kiln, said rotary kiln comprising a furnace core having a powder feed part for receiving said powder into said furnace core;
    wherein a temperature at said powder feed part is kept at 500° C. or more, and wherein a temperature of the powder at a position where the powder is directly fed into said powder feed part is kept at 150° C. or lower;
    such that the powder of lithium-containing carbonate is immediately heated to the temperature at said powder feed part when said powder is received into said furnace core;
    wherein a rotary block, where at least 3 blades are formed, is set inside of the rotary kiln, and, with at least one of 3 blades of the rotary block brought into contact with an inner wall of the rotary kiln, the positive electrode active material is fired by the rotary kiln.

2. The method for producing a positive electrode active material for lithium ion batteries of claim 1, wherein a plurality of the rotary blocks are set inside of the rotary kiln in parallel in a longitude direction of the rotary kiln.

3. The method for producing a positive electrode active material for lithium ion batteries of claim 1, wherein an apex of the blade of the rotary block is formed into a concavo-convex shape.

4. The method for producing a positive electrode active material for lithium ion batteries of claim 1, wherein the positive electrode active material is represented by a compositional formula: $Li_xNi_{1-y}M_yO_{2+\alpha}$ (In the formula, M is one or more kinds selected from Sc, Ti, V, Cr, Mn, Fe, Co, Cu, Zn, Ga, Ge, Al, Bi, Sn, Mg, Ca, B and Zr, $0.9 \leq x \leq 1.2$, $0 < y \leq 0.7$, and $0.05 \leq \alpha$.

5. The method for producing a positive electrode active material for lithium ion batteries of claim 4, wherein M is one or more kinds selected from Mn and Co.

6. The method for producing a positive electrode active material for lithium ion batteries of claim 2, wherein an apex of the blade of the rotary block is formed into a concavo-convex shape.

* * * * *